United States Patent
Bekeredjian et al.

[11] Patent Number: 6,142,173
[45] Date of Patent: Nov. 7, 2000

[54] HIGH PURITY CORROSION RESISTANT BUTTERFLY VALVE

[75] Inventors: Harry H. Bekeredjian, Canoga Park; Jose M. Magno, Jr., North Hollywood; Garry L. Miller; Douglas R. Swingley, both of Saugus, all of Calif.

[73] Assignee: Spears Manufacturing Company, Sylmar, Calif.

[21] Appl. No.: 08/688,332

[22] Filed: Jul. 30, 1996

[51] Int. Cl.⁷ ............................................. F16L 7/00
[52] U.S. Cl. .................................. 137/375; 251/306
[58] Field of Search ............................. 137/375; 251/306

[56] References Cited

U.S. PATENT DOCUMENTS

| | | | |
|---|---|---|---|
| 3,778,028 | 12/1973 | Graves et al. | 137/375 |
| 4,083,529 | 4/1978 | Santy et al. | 251/175 |
| 4,266,752 | 5/1981 | Johnson | 251/173 |
| 4,289,296 | 9/1981 | Krause | 251/306 |
| 4,304,392 | 12/1981 | Maciulaitis | 251/173 |
| 4,317,558 | 3/1982 | Sherlaw | 251/306 |
| 4,318,422 | 3/1982 | Nakanishi et al. | 251/306 |
| 4,351,511 | 9/1982 | Garrigues | 251/174 |
| 4,378,104 | 3/1983 | Ben-Ur | 251/173 |
| 4,542,763 | 9/1985 | Gardner et al. | 137/340 |
| 4,552,332 | 11/1985 | Sonderegger et al. | 251/306 |
| 4,575,046 | 3/1986 | Krause et al. | 251/306 |
| 4,605,201 | 8/1986 | Miyazaki | 251/306 |
| 4,653,724 | 3/1987 | Garrigues et al. | 251/306 |
| 4,685,611 | 8/1987 | Scobie et al. | 251/306 |
| 4,699,357 | 10/1987 | Sisk | 251/306 |
| 4,813,650 | 3/1989 | Dingler | 251/306 |
| 4,822,001 | 4/1989 | Sisk | 251/306 |
| 4,998,708 | 3/1991 | Pavanel | 251/306 |
| 5,029,811 | 7/1991 | Yamamoto et al. | 251/306 |
| 5,207,411 | 5/1993 | Sisk | 251/306 |
| 5,482,252 | 1/1996 | Kamezawa | 251/306 |

FOREIGN PATENT DOCUMENTS

| | | | |
|---|---|---|---|
| 2315046 | 8/1975 | France | 137/375 |
| 2460182 | 7/1975 | Germany | 137/375 |

OTHER PUBLICATIONS

Halar® Fluropolymer General Information Bulletin, Halar Fluoropolymer Resin Advantage, Ausimont, Morristown, N.J., pp. 1–6.
Engineered Butterfly Valves—Model B and C, Chemtrol® Catalog, pp. 17–18.
3"—12" Butterfly Valve Technical Information, Hayward Industrial Products, Inc., Elizabethtown, N.J., 1992, p. 34.
3"—8" Plastic PVC Butterfly Valves, Hayward Industrial Products, Inc., Elizabethtown, N.J., pp. 24–25.
The Keystone Isolator™: PTFE Lined Butterfly Valve, Keystone Valve USA Inc., five (5) pages.

*Primary Examiner*—A. Michael Chambers
*Attorney, Agent, or Firm*—Sheldon & Mak; Denton L. Anderson

[57] ABSTRACT

A high purity, corrosion resistant butterfly valve comprises a pair of body halves each having an inner surface and an outer surface, and an inner face extending between the inner surface and the outer surface; a liner fitted to the inner surface of the body halves and defining a fluid media passage; and a disk member mounted on a stem and pivotally movable in the fluid media passage between open and closed positions. No sealing element is provided between the inner faces of the body to enable the fluid media to pass between the inner faces to the outer surface if leakage occurs and provide an external indication of leakage. The liner and the disk member form a direct seal in the closed position and are substantially the only elements of the butterfly valve that are wetted during service. The liner and the disk member are formed of materials that are corrosion resistant and substantially chemically inert and non-contaminating with respect to high purity, de-ionized water.

18 Claims, 2 Drawing Sheets

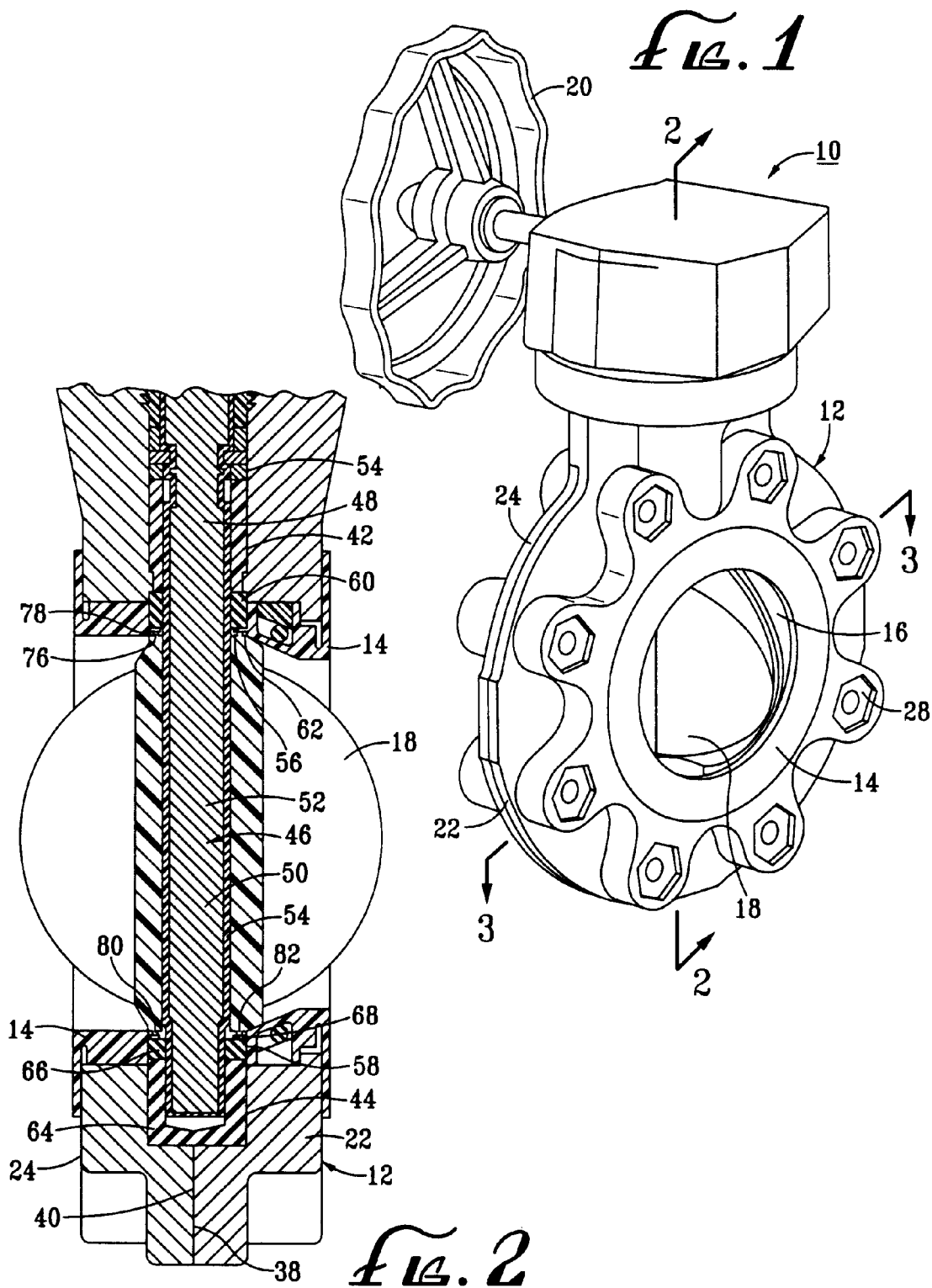

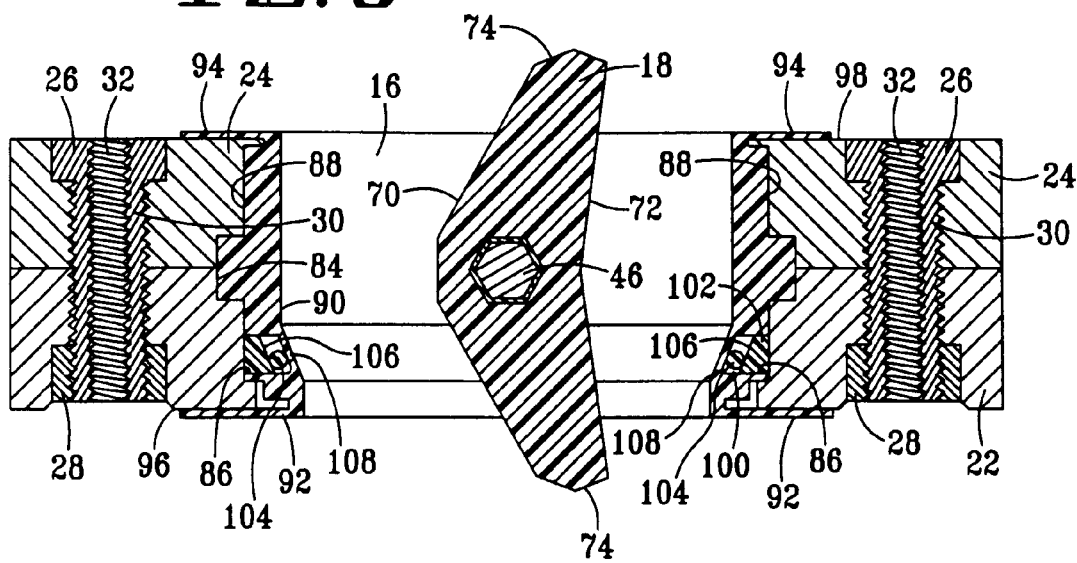

HIGH PURITY CORROSION RESISTANT BUTTERFLY VALVE

BACKGROUND

The present invention relates to fluid flow control valves and, more particularly, to a butterfly valve which is corrosion resistant and provides high purity service in high purity fluid media systems.

Butterfly valves are widely used in fluid media systems to regulate flow. Butterfly valves comprise a body, a stem, and a disk member pivotally movable in the fluid media passage defined by the valve body and an annular seat. The annular seat forms a fluid seal with the disk member in the closed position of the valve.

Butterfly valves are commonly used in aggressive fluid media systems that place severe demands on the valve materials. Applications for these valves include, for example, high purity fluid media systems such as high purity, de-ionized water systems in the semiconductor industry, and fluid systems in the food industry, and highly corrosive chemical systems. Such fluids are extremely corrosive to non-specialty metals. Accordingly, butterfly valve components have been formed of specialty metals such as stainless steels and titanium in an effort to provide enhanced corrosion resistance. These metals have also proven to be inadequate, however, as they also can corrode when used, for example, in high purity, de-ionized water systems.

The wetted metallic components of the known butterfly valves have also been coated with materials such as PTFE to provide chemical resistance. Although these coatings are chemically resistant, they can fail during operation and expose the underlying metal to corrosive attack. As a result, the failed coating and the corrosion product can contaminate the fluid media.

The known butterfly valves have also included non-metallic, non-coated components. For example, plastic valve bodies, elastomeric valve seats, and elastomeric O-ring seals on the disk member or the valve seat, are commonly incorporated into butterfly valves. These components have proved not to be satisfactory because many plastic and elastomeric materials are unable to provide prolonged, non-contaminating service in high purity, highly aggressive fluid media such as high purity, de-ionized water. Some plastics, including PVC and CPVC, contain constituents such as carbon that can be leached out by high purity fluid media and contaminate the fluid media systems. The elastomeric components deteriorate and allow fluid media to leak into various areas of the valve and corrode, or cause leaching of, the metal components. The elastomeric materials can then become entrained in the fluid media stream and contaminate the system.

Furthermore, known butterfly valves typically comprise joints, seams, crevices and grooves in the fluid media passage at which stagnation and contamination can occur.

Another problem is that the known butterfly valves are designed to contain fluid media leakage within the valve body. The valve bodies either have a one-piece body or comprise two body halves. In the one-piece body construction, sealing elements are typically provided about the stem to contain the fluid media inside the body. In the two-piece body constructions, a seal is typically positioned between the body halves to prevent any fluid media that leaks into the valve stem area from passing out of the valve body. The contained fluid can corrode, or cause leaching of, metal components of the valve, and the resultant contamination can become entrained in the fluid media stream.

Moreover, because the leaked fluid media is contained within the body in the known butterfly valves, it is not possible to visually examine the outer surface of the valves for evidence of internal fluid media leakage. As a result, when contamination is detected in the system, it is not possible to simply visually inspect each of the valves to positively locate the contamination source. This problem has severe implications in multi-valve systems. In order to determine the source of contamination in such systems, it is necessary to shut down the system and disassemble a number of valves to locate a faulty valve. After the faulty valve is repaired or replaced, the system can then be re-activated. If contamination is determined to still be present in the system, however, the system must be shut down once again and additional valves must be disassembled and inspected to positively eliminate the source of contamination. Such system shut-down and valve disassembly and inspection can result in significant lost service time and related costs.

Thus, there is a need for an improved butterfly valve that overcomes the above-described problems associated with the known butterfly valves and provides contamination free service in high purity fluid systems. More particularly, there is a need for a butterfly valve that i) is resistant to corrosive fluid media and all wetted components are substantially not subject to leaching; ii) comprises no coated wetted components to contaminate the system in the event of coating failure; iii) comprises no wetted elastomeric elements that can deteriorate and contaminate the system; iv) provides a direct interference seal between the disk member and the seat without the use of wetted elastomeric seals; and v) allows leaked fluid media to pass out of the body to prevent potential contamination of the fluid media stream and to enable external visual inspection of the butterfly valve for internal fluid leakage.

SUMMARY

The present invention is directed to a high purity, corrosion resistant butterfly valve that satisfies the above needs and provides substantially contamination free service in high purity fluid systems. The present butterfly valve i) is resistant to corrosive fluid media and all wetted components are substantially not subject to leaching; ii) comprises no coated wetted components to contaminate the system in the event of coating failure; iii) comprises no wetted elastomeric elements that can deteriorate and contaminate the system; iv) provides a direct interference seal between the disk member and the valve seat without the use of wetted elastomeric seals; and v) allows leaked fluid media to pass naturally out of the body to prevent potential contamination of the fluid media stream and to enable external visual inspection of the butterfly valve for internal fluid leakage.

The butterfly valve according to the present invention comprises a body having an inner surface and an outer surface. A flexible liner is fitted to the inner surface of the body. The liner includes an inner surface which defines a fluid media passage and an outer surface. A disk member is mounted to a stem which is received in upper and lower bores of the body. The disk member is pivotally movable in the fluid media passage between open and closed positions. The disk member preferably has a one-piece, solid construction.

The liner and the disk member are each formed of a suitable plastic material that is corrosion resistant and substantially chemically inert with respect to high purity, de-ionized water. The liner is preferably formed of polytetrafluoroethylene and the disk member preferably consists essentially of a 1:1 alternating copolymer of ethylene and chlorotrifluoroethylene.

The inner surface of the liner includes an inwardly converging portion. The disk member comprises a face having a surface shaped to form a direct fluid seal with the inwardly converging portion in the closed position.

The body preferably comprises a pair of body halves each having an inner face extending between the inner surface and the outer surface of the body. There is preferably no sealing element between the inner faces to enable the fluid media to pass between the inner faces to the outer surface of the body. This prevents the internal containment of the fluid media within the valve body. The body is preferably formed of a plastic material and, more preferably, polyvinylchloride or chlorinated polyvinylchloride.

The disk member comprises a top face and a bottom face through which the stem extends. The liner defines an upper opening and a lower opening. Resilient biasing elements are disposed within the upper opening and the lower opening to resiliently bias the inner surface of the liner into direct sealing engagement with the top face and the bottom face of the disk member in the open and closed positions to substantially prevent the fluid media from entering the upper opening and the lower opening and wetting the stem. Accordingly, substantially only the liner and the disk member are wetted during service.

The resilient biasing elements disposed in the upper and lower openings of the liner are preferably formed of polyurethane.

The liner defines a channel between the inner surface and the outer surface. A resilient biasing member is disposed in the channel for resiliently biasing the inner surface of the liner into direct sealing engagement with the disk member in the closed position.

The stem comprises a metallic core having thereon a coating comprised of polytetrafluoroethylene. The metallic core is preferably formed of titanium or stainless steel.

DRAWINGS

These and other features, aspects and advantages of the present invention will become better understood from the following drawings, description and appended claims, where:

FIG. 1 is a perspective illustrational view of a butterfly valve in accordance with the invention in an open position;

FIG. 2 is a fragmentary cross-sectional view in the direction of line 2—2 of FIG. 1;

FIG. 3 is a cross-sectional view in the direction of line 3—3 of FIG. 1 showing the disk in an open position; and FIG. 4 is a cross-sectional view showing the disk in the closed position.

DESCRIPTION

With reference to the figures, the present invention is directed to a high purity, corrosion resistant butterfly valve 10.

The butterfly valve 10 according to the present invention comprises a body 12, a liner 14 fitted to the body 12 and defining a fluid media passage 16, a disk member 18 pivotally movable in the fluid media flow passage 16 between selected open and the closed positions, and a handle assembly 20 for manually setting the angular position of the disk member 18 to regulate the flow of the fluid media through the fluid media passage 16.

Referring to FIG. 2, the body 12 comprises a pair of body halves 22, 24. The body halves 22, 24 are formed of a material that is suitably strong and durable, and corrosion resistant. Materials having these properties that can be used to form the body halves 22, 24 include plastic materials such as polyvinylchloride (PVC), chlorinated polyvinylchloride (CPVC) and the like.

The body halves 22, 24 are secured together by a plurality of fastening elements. The fastening elements can comprise a recessed internally and externally threaded fastener element 26 which engages with an internally threaded element 28 such as shown in FIG. 3. The fastening elements 26, 28 are positioned within circularly arranged bores 30 and are provided to both secure the body halves 22, 24 together, and to provide an internally threaded hole 32 for attachment to a fluid media piping system, such as by use of a mating pipe flange (not shown). The fastening elements 26, 28 are preferably comprised of a corrosion resistant metal such as stainless steel or the like, to provide corrosion resistance to the fluid media and the external atmosphere.

The body halves 22, 24 have a flat, inner face 38, 40, respectively, which directly abut each other in the assembled condition of the butterfly valve 10. The butterfly valve 10 preferably comprises no sealing elements between the inner faces 38, 40, so that any fluid media that leaks into the space between the inner faces 38, 40 naturally seeps out of the body 12 and is not contained therein.

The body halves 20, 22 define an upper bore 42 and an aligned lower bore 44 in the body 12 for receiving a stem 46. The stem 46 has a one-piece construction and includes an upper portion 48 disposed in the upper bore 42 and a lower portion 50 disposed in the lower bore 44.

The stem 46 comprises a metallic core 52 and a nonmetallic coating 54 formed on the core 52. The core 52 is formed of a material that has adequate strength to withstand the rated pressure of the butterfly valve 10, and is resistant to corrosive substances in the external atmosphere. Suitable materials for forming the core 52 include 316 and 416 stainless steels, titanium and the like. The coating 54 preferably comprises polytetrafluoroethylene (PTFE), which is commercially available under the trademark "TEFLON" from DuPont Nemours, Inc., Wilmington, Del. PTFE is substantially chemically inert and substantially non-contaminating with respect to high purity fluid systems such as high purity, de-ionized water systems.

As used herein, the term "substantially non-contaminating" means that substantially no constituents of the material are leached or extracted into the fluid media and the fluid media has substantially no effect on the material composition.

As used herein, the term "substantially chemically inert" means that the material is substantially negatively unaffected when exposed to the fluid media.

As used herein, "high-purity deionized water" refers to deionized water having a very high electrical resistance, typically of at least about 20 MΩ. Deionized water of this high purity is essentially void of conducting impurities that increase electrical conductivity through water.

The handle assembly 20 is connected to the upper portion 48 of the stem 46 (not shown). The upper portion 48 of the stem 46 is rotatably supported in the upper bore 42 of the body 12 by a conventional stem bushing 54.

The liner 14 defines an upper opening 56 and an aligned lower opening 58. A cylindrical elastic element 60 is fitted on the upper portion 48 of the stem 46 within the upper opening 56. The elastic element 60 is supported by a thin upper rim 62 of the liner 14.

The lower portion 50 of the stem 46 is supported by a bushing 64 received within the lower bore 44 of the body 12 and the lower opening 58 of the liner 14. An elastic element 66 is disposed on the stem 46 between the bushing 64 and a thin lower rim 68 of the liner 14.

The disk member 18 is mounted to the stem 46 and is pivotally movable in the fluid media passage 16. The disk member 18 comprises opposed side faces 70, 72, and a peripheral face 74. A circular bead 76 is formed on a top face 78 of the disk 18. The upper rim 62 of the liner 14 is resiliently urged against the circular bead 76 by downward acting force exerted by the elastic element 60, to form a fluid-tight seal between the liner 14 and the disk member 18. This seal is effective to substantially prevent the fluid media from entering the upper bore 42 of the body 12.

Similarly, a circular bead 80 is formed on a lower face 82 of the disk member 18. The lower rim 68 of the liner 14 is resiliently urged against the circular bead 80 by upward acting force exerted by the elastic element 66 to form a fluid seal between the liner 14 and the disk member 18. This seal substantially prevents the fluid media from entering the lower bore 44 of the body 12.

As the upper bore 42 and the lower bore 44 of the body 12 are substantially sealed with respect to the fluid media, the stem 46 is not wetted during service.

The disk member 18 is preferably solid and comprises no coating that can fail and contaminate the fluid media. The disk member 18 preferably consists essentially of a material that is resistant to corrosive fluid media, and is substantially inert and non-contaminating with respect to high purity fluid media such as high purity, de-ionized water.

An excellent material for forming the disk member 18 is "HALAR", a fluoropolymer having a 1:1 alternating copolymer of ethylene and chlorotrifluoroethylene chemical structure. "HALAR" is commercially available from AUSIMONT of Morristown, N.J. "HALAR" also has sufficient rigidity and stiffness to withstand the fluid media pressure and torsion, and can be injection molded into the shape of the disk member 18.

The elastic elements 60, 66 are preferably formed of polyurethane which provides resistance to compression setting. Compression setting is undesirable in that it can reduce the ability of the elastic elements 60, 66 to create a fluid tight seal between the liner 14 and the disk member 18.

The elastic elements 60, 66 may optionally be provided in shapes other than the preferred shape; for example, as O-rings, wafer rings, wave rings or compression springs (not shown).

The elastic elements 60, 66 may optionally be formed of metallic materials having corrosion resistance to the fluid media. Suitable metallic materials for forming the metallic springs include, for example, stainless steel and titanium.

Referring to FIGS. 3 and 4, the liner 14 is generally annular shaped and has a one-piece construction. The liner 14 comprises an outer surface 84 which abuts a portion of the inner surface 86, 88 of the respective body halves 22, 24, and an inner surface 90 which defines the fluid media passage 16.

The liner 14 is composed of a flexible, resilient material that is resistant to corrosive fluid media, and is substantially inert and non-contaminating with respect to high-purity fluid media such as high purity, de-ionized water. The liner 14 is sufficiently flexible such that it can flex and form a direct interference seal with the disk member 18. The liner 14 is composed of a non-elastomeric material to avoid the problem of deterioration and contamination in such high purity fluid media. "TEFLON" is an excellent material for the liner 14 because it is resistant to highly corrosive fluid media and is substantially chemically inert and non-contaminating with respect to high-purity fluid media such as high purity, de-ionized water. "TEFLON" can also be molded and machined into the shape of the liner 14. Other less preferred materials include polypropylene and the like.

The shape of the outer surface 84 of the liner 14 closely matches the shape of the inner surface 86, 88 of the body 12 to enable the liner 14 to be closely fitted to the body 12. The liner 14 comprises side flanges 92, 94 which abut the side faces 96, 98, respectively, of the body halves 22, 24, respectively, to further secure the liner 14 to the body 12.

An annular channel 100 extends around the liner 14 between the inner surface 90 of the liner 14 and the inner surface 86, 88 of the body 12. A resilient biasing member, including a backing element 102 and a resilient element 104, is disposed in the annular channel 100 and extends around the liner 14. The resilient biasing member resiliently biases the liner 14 into direct sealing engagement with the disk member 18 in the closed position shown in FIG. 4. The backing element 102 abuts the inner surface 86 and has a face 106 having approximately the same orientation as the thin region 108 of the liner 14. The resilient element 104 is preferably an O-ring which contacts the backing element 102 and the thin region 108. The backing element 102 forces the O-ring 104 against the thin region 108 of the liner 14.

The backing element 102 and the O-ring 104 are not wetted during operation of the butterfly valve 10 and, accordingly, are not subject to corrosion or leaching. The backing element 102 and O-ring 104 are preferably comprised of materials capable of compensating for slight dimensional changes in the disk member 18 and the body 12 due to creep and thermal expansion and contraction. In addition, the materials preferably allow for flexure of the disk member 18 and the stem 46, as well as movement of the liner 14 and the body 12 during pressurization of the butterfly valve 10. Exemplary materials for forming the backing element 102 include PVC, CPVC and polypropylene. Exemplary materials for forming the O-ring 104 include "VITON", a fluoro-elastomer available from DuPont Nemours, Inc., Wilmington, Del.; ethylene-propylene terpolymer (EPDM); urethane and polyurethane.

The inner surface 90 of the liner 14 is contoured to form a direct interference fluid seal with the disk member 18 at thin region 108. At the location of the thin region 108, the inner surface 90 converges such that the flow passage 16 is generally cone-shaped. The face 74 of the disk member 18 forms an interference seal with the thin region 108 of the liner 14 in the closed position of the disk member 18. In this position, the backing element 102 and the O-ring 104 exert a force approximately perpendicular to the face 74. This force creates a fluid-tight seal between the disk member 18 and the liner 14, to ensure leak-free shutoff at the rated fluid pressure. The lug-type construction of the butterfly valve 10 provides dead-end service in either direction.

The direct interference seal formed between the liner 14 and the disk member 18 simplifies the valve 10 construction and also eliminates crevices at which stagnation and contamination can occur. The interference seal eliminates the use of elastomeric, wetted sealing elements on the disk member 18 or the liner 14. Such sealing elements can deteriorate in sensitive fluid systems such as de-ionized water systems, and introduce contaminants into the fluid media.

The stem 46 is preferably positioned at about the center of the flow passage 16 so that the fluid medium exerts approximately equal pressure across the face 72 of the disk member 18, stabilizing the disk member 18 in the closed position.

The fluid seals formed between the circular beads 76, 80 of the disk member 18 and the liner 14, substantially prevent the fluid media from leaking into the upper bore 42 and the lower bore 44 of the body 12. Consequently, only the disk member 18 and the liner 14, and not the stem 46, are wetted in service. As the disk member 18 and the liner 14 are substantially chemically inert to corrosive fluid media and high purity fluid media such as de-ionized water, the butterfly valve 10 provides high-purity, substantially contamination free service in such sensitive fluid media systems. In addition, any fluid media that may leak into the upper bore 42 or the lower bore 44 of the body 12 cannot corrode the metallic core 50 of the stem 46 due to the corrosion resistant coating 54 formed on the core 50. Accordingly, leaching of metallic constituents into the fluid media is avoided. Furthermore, such fluid media leakage is not contained in the upper bore 42 or the lower bore 44 as in the known butterfly valves, but rather is allowed to naturally pass out of the body 12 between the body halves 22, 24 due to the absence of any sealing element between the body halves 22, 24. This construction prevents any contamination from becoming entrained in the fluid media stream.

Therefore, the butterfly valve 10 according to the present invention provides high purity, substantially contamination free service in highly corrosive fluid media and in sensitive, high purity fluid media systems such as high purity, de-ionized water systems. The butterfly valve 10 comprises no coated, wetted components to contaminate the fluid system in the event of coating failure, and no wetted elastomeric sealing elements that can deteriorate and contaminate the system. The butterfly valve 10 provides a direct, fluid-tight interference seal between the disk member 18 and the liner 14 without the use of wetted elastomeric sealing elements commonly used in the known butterfly valves. The fluid-tight seals formed between the liner 14 and the disk member 18 prevent the leakage of fluid media into the upper bore 44 and the lower bore 42 of the body 12, and also provide leak-free shut off of the butterfly valve 10 at the rated fluid media pressure.

The butterfly valve 10 can be externally visually inspected for fluid seepage from the body 12, indicating the failure of the fluid seals. Thus, any faulty valve can be readily located and repaired or replaced without having to shut down the system for an extended period of time. This is an important advantage over the known butterfly valves, which must be disassembled and inspected to positively determine whether a particular valve is leaking and a source of contamination in the system. Such disassembly and inspection can produce extensive delays and related costs, especially in multi-valve systems.

The present invention has been described in considerable detail with reference to certain preferred embodiments thereof, however, other embodiments are possible. Therefore, the spirit and scope of the appended claims should not be limited to the description of the preferred embodiments contained herein.

What is claimed is:

1. A high purity, corrosion resistant butterfly valve, comprising:
    (a) a body having an inner surface and an outer surface;
    (b) a liner secured to the inner surface of the body, the liner including an inner surface defining a fluid media passage; and
    (c) a disk member pivotally movable in the fluid media passage between open and closed positions, the disk member forming a direct fluid seal with the liner in the closed position;
    (d) wherein the liner is not a coating, and wherein the liner and the disk member are substantially chemically inert and substantially non-contaminating with respect to high purity, de-ionized water.

2. The butterfly valve of claim 1, wherein the body consists essentially of a plastic material.

3. The butterfly valve of claim 1, wherein the body comprises a pair of body halves each having an inner face extending between the inner surface and the outer surface of the body, the butterfly valve comprises no sealing element between the inner faces to enable the fluid media to pass between the inner faces to the outer surface of the body to provide an external indication of leakage.

4. The butterfly valve of claim 1, wherein the liner is comprised of polytetrafluoroethylene.

5. The butterfly valve of claim 1, wherein the inner surface of the liner comprises an inwardly converging portion, and the disk member comprises a peripheral face shaped to form the fluid seal with the inwardly converging portion in the closed position.

6. The butterfly valve of claim 1, wherein the disk member is secured to a rotatable stem, the disk member comprises a top face and a bottom face, the liner defines an upper opening and a lower opening through which the stem extends, the butterfly valve further comprises first resilient biasing means disposed within the upper opening and the lower opening for resiliently biasing the inner surface of the liner into direct sealing engagement with the top face and the bottom face of the disk member in the open and closed positions to substantially prevent the fluid media from entering the upper opening and the lower opening and wetting the stem.

7. The butterfly valve of claim 6, wherein the first resilient biasing means comprises an upper elastic element on the stem in the upper opening for resiliently biasing the inner surface of the liner into direct sealing engagement with the top face of the disk member, and a lower elastic element on the stem in the lower opening for resiliently biasing the inner surface of the liner into direct sealing engagement with the bottom face of the disk member.

8. The butterfly valve of claim 6, wherein the liner further comprises an outer surface and a channel between the inner surface and the outer surface to the liner, the butterfly valve further comprises second resilient biasing means disposed in the channel for resiliently biasing the inner surface of the liner into direct sealing engagement with the disk member in the closed position.

9. The butterfly valve of claim 8, wherein the liner comprises an inwardly converging portion including a thin walled region, the disk member comprises a peripheral face, the second resilient biasing means exerts a force on the thin walled region in the closed position so as to form a fluid seal between the thin walled region and the peripheral face.

10. The butterfly valve of claim 9, wherein the second resilient biasing means comprises a backing element which abuts the body, a resilient element which is disposed between and contacts the backing element and the outer surface of the liner.

11. The butterfly valve of claim 10, wherein the backing element comprises a face which contacts the resilient element, the face being substantially parallel to the thin-walled region of the liner.

12. The butterfly valve of claim 1, wherein the disk member consists essentially of a 1:1 alternating copolymer of ethylene and chlorotrifluoroethylene.

13. The butterfly valve of claim 1 wherein the liner comprises at least one side flange to secure the liner to the body.

14. A high purity, corrosion resistant butterfly valve, comprising:
   (a) a body having an inner surface and an outer surface, the body including a pair of body halves each having an inner face extending between the inner surface and the outer surface, the butterfly valve comprises no sealing element between the inner faces so as to enable the fluid media to pass between the inner faces to the outer surface to provide an external indication of leakage;
   (b) a liner secured to the inner surface of the body, the liner including an inner surface defining a fluid media passage; and
   (c) a disk member pivotally movable in the flow passage between open and closed positions, the disk member forming a direct fluid seal with the liner in the closed position;
   (d) wherein the liner is not a coating, and wherein the liner and the disk member are substantially chemically inert and substantially non-contaminating with respect to high purity, de-ionized water.

15. The butterfly valve of claim 14, wherein the disk member is secured to a rotatable stem, the disk member comprises a top face and a bottom face, the liner defines an upper opening and a lower opening through which the stem extends, the butterfly valve further comprises first resilient biasing means on the stem within the upper opening and the lower opening for resiliently biasing the inner surface of the liner into direct sealing engagement with the top face and the bottom face of the disk member in the open and closed positions to substantially prevent the fluid media from entering the upper opening and the lower opening and wetting the stem.

16. The butterfly valve of claim 15, further comprising second resilient biasing means disposed within the liner for resiliently biasing the inner surface of the liner into direct sealing engagement with the disk member in the closed position.

17. A high purity, corrosion resistant butterfly valve, comprising:
   (a) a body having an inner surface and an outer surface, the body including a pair of body halves each having an inner face extending between the inner surface and the outer surface, the butterfly valve comprises no sealing element between the inner faces to enable the fluid media to pass between the inner faces to the outer surface to provide an external indication of leakage;
   (b) a liner fitted to the inner surface of the body, the liner including an inner surface defining a fluid media passage, an outer surface, and a channel between the inner surface and the outer surface, the liner being composed of polytetrafluoroethylene;
   (c) a disk member mounted on a stem, the disk member being pivotally movable in the flow passage between open and closed positions, the disk member consisting essentially of a 1:1 alternating copolymer of ethylene and chlorotrifluoroethylene; and
   (d) first resilient biasing means disposed in the channel for resiliently biasing the inner surface of the liner into direct sealing engagement with the disk member in the closed position;
   wherein the liner is not a coating.

18. The butterfly valve of claim 17, wherein the disk member is secured to a rotatable stem, the disk member comprises a top face and a bottom face, the liner defines an upper opening and a lower opening through which the stem extends, the butterfly valve further comprises second resilient biasing means on the stem within the upper opening and the lower opening for resiliently biasing the inner surface of the liner into direct sealing engagement with the top face and the bottom face of the disk member in the open and closed positions to substantially prevent the fluid media from entering the upper opening and the lower opening and wetting the stem.

\* \* \* \* \*